United States Patent
Shangguan et al.

(10) Patent No.: US 12,530,897 B2
(45) Date of Patent: Jan. 20, 2026

(54) TRAFFIC STATISTICS COLLECTION METHOD AND APPARATUS

(71) Applicant: BOE Technology Group Co., Ltd., Beijing (CN)

(72) Inventors: Zeyu Shangguan, Beijing (CN); Hanwen Liu, Beijing (CN); Fanhao Kong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 370 days.

(21) Appl. No.: 18/018,712

(22) PCT Filed: Feb. 23, 2022

(86) PCT No.: PCT/CN2022/077398
§ 371 (c)(1),
(2) Date: Jan. 30, 2023

(87) PCT Pub. No.: WO2023/159371
PCT Pub. Date: Aug. 31, 2023

(65) Prior Publication Data
US 2025/0095370 A1    Mar. 20, 2025

(51) Int. Cl.
*G06V 20/52* (2022.01)
*G06T 3/40* (2024.01)
(Continued)

(52) U.S. Cl.
CPC .............. *G06V 20/52* (2022.01); *G06T 3/40* (2013.01); *G06V 20/53* (2022.01); *G06V 40/10* (2022.01); *G06V 40/20* (2022.01)

(58) Field of Classification Search
CPC ........ G06V 20/52; G06V 40/10; G06V 40/20; G06T 3/40
See application file for complete search history.

(56) References Cited

U.S. PATENT DOCUMENTS

| 2014/0211994 | A1 | 7/2014 | Takenaka et al. |
| 2020/0349348 | A1* | 11/2020 | Zhou ................. G06V 40/103 |
| 2024/0054805 | A1* | 2/2024 | Kamimura .......... G06V 40/103 |

FOREIGN PATENT DOCUMENTS

| CN | 102129690 A | 7/2011 |
| CN | 103021059 A | 4/2013 |
| (Continued) | | |

OTHER PUBLICATIONS

PCT/CN2022/077398 international search report.
PCT/CN2022/077398 Written Opinion.
CN 202280000256.5 first office action dated May 30, 2025.

*Primary Examiner* — Ross Varndell
*Assistant Examiner* — Nhut Huy Pham
(74) *Attorney, Agent, or Firm* — IPro, PLLC

(57) ABSTRACT

The present disclosure provides a traffic statistics collection method and apparatus. The method includes: obtaining a first image of a target place; performing body detection on the first image to obtain body detection boxes of respective target objects in the first image, where the body detection boxes indicate body areas of the respective target objects; for each target object of the respective target objects, determining a head detection box of the target object according to the body detection box of the target object, wherein the head detection box indicates a head area of the target object; and obtaining a traffic statistics result of the target place according to head detection boxes of the respective target objects.

16 Claims, 6 Drawing Sheets

(51) Int. Cl.
*G06V 40/10* (2022.01)
*G06V 40/20* (2022.01)

(56) References Cited

FOREIGN PATENT DOCUMENTS

| | | | | | |
|---|---|---|---|---|---|
| CN | 104239908 | A | | 12/2014 | |
| CN | 105512640 | A | | 4/2016 | |
| CN | 107330386 | A | | 11/2017 | |
| CN | 109448026 | A | * | 3/2019 | |
| CN | 109740516 | A | | 5/2019 | |
| CN | 112036257 | A | * | 12/2020 | ......... G06K 9/00228 |
| CN | 112052838 | A | | 12/2020 | |
| CN | 112257660 | A | | 1/2021 | |
| CN | 112488057 | A | | 3/2021 | |
| CN | 112926410 | A | | 6/2021 | |
| CN | 113011258 | A | | 6/2021 | |
| CN | 113034544 | A | | 6/2021 | |
| CN | 113269065 | A | | 8/2021 | |
| CN | 113361479 | A | | 9/2021 | |
| CN | 113449645 | A | * | 9/2021 | |
| JP | 2011210238 | A | | 10/2011 | |

* cited by examiner

TRAFFIC STATISTICS COLLECTION METHOD AND APPARATUS

CROSS REFERENCE TO RELATED APPLICATIONS

This application is the national phase of International Application No. PCT/CN2022/077398 filed on Feb. 23, 2022, the disclosure of which is hereby incorporated by reference in its entirety.

TECHNICAL FIELD

The present disclosure relates to the field of image processing technologies, and in particular to a traffic statistics collection method and apparatus.

BACKGROUND

With the development of technology, image recognition technologies are widely used in various fields, for example, the field of pedestrian traffic statistics.

At present, when collecting pedestrian traffic entering and leaving a target place, image recognition is performed on collected related images to determine one or more face boxes or one or more body boxes in the images for traffic statistics.

However, when performing traffic statistics based on the one or more face boxes, it is easily affected by light or environment, resulting in missed detection of faces, and then resulting in relatively low accuracy of traffic statistics; and when performing traffic statistics based on the one or more body boxes, a problem of false detection caused by the jitter of the body box is likely to occur, resulting in relatively low accuracy of traffic statistics.

SUMMARY

In view of this, one object of the present disclosure is to provide a traffic statistics collection method and apparatus.

According to a first aspect of the present disclosure, there is provided a traffic statistics collection method, including:
  obtaining a first image of a target place;
  performing body detection on the first image to obtain body detection boxes of respective target objects in the first image, where the body detection boxes indicate body areas of the respective target objects;
  for each target object of the respective target objects, determining a head detection box of the target object according to the body detection box of the target object, wherein the head detection box indicates a head area of the target object; and
  obtaining a traffic statistics result of the target place according to head detection boxes of the respective target objects.

Optionally, determining the head detection box of the target object according to the body detection box of the target object includes:
  obtaining a width and a height of the body detection box; and
  performing a zoom-out operation on the body detection box according to the width and the height of the body detection box to obtain the head detection box.

Optionally, the target object is a person, performing a zoom-out operation on the body detection box according to the width and the height of the body detection box to obtain the head detection box includes:
  determining an aspect ratio of the body detection box according to the width and the height of the body detection box;
  obtaining a target ratio range to which the aspect ratio of the body detection box belongs, where the target ratio range is determined based on a human body posture of the target object;
  obtaining a height reduction ratio corresponding to the target ratio range, and performing a zoom-out operation on the body detection box in a height direction based on the height reduction ratio.

Optionally, the method further includes:
  performing a zoom-out operation on the body detection box in a width direction based on a preset width reduction ratio;
  or
  obtaining a width reduction ratio corresponding to the target ratio range, and performing a zoom-out operation on the body detection box in a width direction based on the width reduction ratio.

Optionally, obtaining a traffic statistics result of the target place according to the head detection boxes of the respective target objects includes:
  for each target object of the respective target objects, determining a behavior state of the target object according to a position relationship between the head detection box of the target object and a set area in the first image of the target place, where the behavior state of the target object indicates whether the target object enters or leaves the target place; and
  determining the traffic statistics result of the target place according to behavior states of the respective target objects.

Optionally, determining the behavior state of the target object according to the position relationship between the head detection box of the target object and the set area in the first image of the target place includes:
  determining a position determination result for the target object according to the position relationship between the head detection box of the target object and the set area in the first image of the target place; where the position determination result indicates whether the target object enters the set area; and
  determining the behavior state of the target object according to the position determination result.

Optionally, the set area includes an entry area and an exit area,
  determining the behavior state of the target object according to the position determination result includes at least one of:
  in response to that two adjacent position determination results successively indicate the target object passing through the entry area and passing through the exit area, determining that the behavior state indicates entering the target place;
  in response to that two adjacent position determination results successively indicate the target object passing through the exit area and passing through the entry area, determining that the behavior state indicates leaving the target place.

Optionally, the first image is a frame of image in an image sequence, and the position relationship indicates whether the target object is in the set area;
  determining the position determination result for the target object according to the position relationship between the head detection box of the target object and the set area in the first image of the target place includes:
  in response to that position relationships in more than a first set number of continuous frames indicate the target object being in the set area, determining that the position determination result for the target object indicates that the target object enters the set area.

Optionally, a bounding box of the set area includes an outer bounding box and an inner bounding box,
the method further includes:
  in response to that the head detection box of the target object is within the inner bounding box of the set area, determining that the position relationship between the head detection box and the set area indicates that the target object is in the set area;
  in response to that the head detection box of the target object is between the inner bounding box and the outer bounding box of the set area, determining a position relationship between the head detection box and the set area according to a second image, where the second image is an image prior to the first image; and
  in response to that the head detection box of the target object is outside of the outer bounding box of the set area, determining that the position relationship between the head detection box and the set area indicates that the target object is not in the set area.

Optionally, determining the position relationship between the head detection box and the set area according to the second image includes:
  in response to that a position relationship between the head detection box of the target object and a set area in the second image indicates the target object being in the set area, determining that the position relationship between the head detection box of the target object and the set area in the first image indicates that the target object is in the set area; and
  in response to that the position relationship between the head detection box of the target object and the set area in the second image indicates that the target object being not in the set area, determining that the position relationship between the head detection box of the target object and the set area in the first image indicates that the target object is not in the set area.

Optionally, the method further includes:
  obtaining a setting request of a set area; and
  performing a corresponding setting processing on the set area according to the setting request, where the setting processing includes at least one of an opening processing for the set area, a closing processing for the set area, a setting processing for an opening time period corresponding to the set area, or a setting processing for an interval between the outer bounding box and the inner bounding box.

Optionally, a bounding box corresponding to the set area comprises a first bounding line and a second bounding line, wherein the first bounding line is one side of the set area which is preset based on a direction for entering the target place such that the target place can be entered by way of the first bounding line; the second bounding line is one side of the set area which is preset based on a direction for leaving the target place such that the target place can be left by way of the second bounding line, and the first bounding line is opposite to the second bounding line;
  determining the behavior state of the target object according to the position determination result includes:

in response to that two adjacent position determination results are different, obtaining a bounding line through which the target object recently passes, where the bounding line is the first bounding line or the second bounding line; and
  determining the behavior state of the target object according to the bounding line and the two adjacent position determination results.

Optionally, determining the behavior state of the target object according to the bounding line and the two adjacent position determination results includes:
  in response to that the bounding line is the first bounding line and the two adjacent position determination results successively indicate the target object entering the set area and un-entering the set area, determining that the behavior state of the target object is entering the target place;
  and/or
  in response to that the bounding line is the second bounding line and the two adjacent position determination results successively indicate the target object entering the set area and un-entering the set area, determining that the behavior state of the target object is leaving the target place.

Optionally, the method further includes:
  obtaining characteristic information of the respective target objects in the first image;
  determining an object identifier corresponding to each of the respective target objects according to the characteristic information; and
  displaying the object identifier of the target object on the first image.

Optionally, determining the object identifier corresponding to each of the respective target objects according to the characteristic information includes:
  in response to that the target object is an object appearing for a first time, assigning one or more object identifiers other than the object identifier included in the first image to the target object, and storing a corresponding relationship between the characteristic information of the target object with the one or more object identifiers in a preset table; and
  in response to that the target object is not the object appearing for the first time, obtaining the object identifier of the target object from the preset table according to the characteristic information of the target object.

Optionally, the method further includes:
  for the target object to which the one or more object identifiers have been assigned, in response to position relationships in greater than a second set number of continuous frames not detecting the target object, deleting the corresponding relationship between the characteristic information of the target object with the one or more object identifiers from preset table.

According to a second aspect of the present disclosure, there is provided a traffic statistics collection apparatus, including:
  an image obtaining module configured to obtain a first image of a target place;
  an image processing module configured to perform body detection on the first image to obtain body detection boxes of respective target objects in the first image, where the body detection boxes indicate body areas of the respective target objects;
  a head determining module configured to, for each target object of the respective target objects, determine a head detection box of the target object according to the body detection box of the target object, wherein the head detection box indicates a head area of the target object; and a traffic statistics module configured to obtain a traffic statistics result of the target place according to head detection boxes of the respective target objects.

Optionally, the head determining module is configured to: obtain a width and a height of the body detection box; and perform a zoom-out operation on the body detection box according to the width and the height of the body detection box to obtain the head detection box.

Optionally, the target object is a person, the head determining module is further configured to: determine an aspect ratio of the body detection box according to the width and the height of the body detection box;

obtain a target ratio range to which the aspect ratio of the body detection box belongs, where the target ratio range is determined based on a human body posture of the target object;

obtain a height reduction ratio corresponding to the target ratio range, and perform a zoom-out operation on the body detection box in a height direction based on the height reduction ratio.

Optionally, the head determining module is configured to: perform a zoom-out operation on the body detection box in a width direction based on a preset width reduction ratio;

or obtain a height reduction ratio corresponding to the target ratio range, and perform a zoom-out operation on the body detection box in a height direction based on the height reduction ratio.

Optionally, the traffic statistics module is configured to: for each target object of the respective target objects, determine a behavior state of the target object according to a position relationship between the head detection box of the target object and a set area in the first image of the target place, where the behavior state of the target object indicates whether the target object enters or leaves the target place; and the traffic statistics result of the target place according to behavior states of the respective target objects.

Optionally, the traffic statistics module is further configured to:

determine a position determination result for the target object according to the position relationship between the head detection box of the target object and the set area in the first image of the target place; where the position determination result indicates whether the target object enters the set area; and determine the behavior states of the target object according to the position determination result.

Optionally, the set area includes an entry area and an exit area, the traffic statistics module is further configured to:

in response to that two adjacent position determination results successively indicate the target object passing through the entry area and passing through the exit area, determine that the behavior state indicates entering the target place;

in response to that two adjacent position determination results successively indicate the target object passing through the exit area and passing through the entry area, determine that the behavior state indicates leaving the target place.

Optionally, the first image is a frame of image in an image sequence, and the position relationship indicates whether the target object is in the set area;

the traffic statistics module is further configured to:

in response to that position relationships in more than a first set number of continuous frames indicate the target object being in the set area, determine that the position determination result for the target object indicates that the target object enters the set area.

Optionally, a bounding box of the set area includes an outer bounding box and an inner bounding box, the traffic statistics module is further configured to:

in response to that the head detection box of the target object is within the inner bounding box of the set area, determine that the position relationship between the head detection box and the set area indicates that the target object is in the set area;

in response to that the head detection box of the target object is between the inner bounding box and the outer bounding box of the set area, determine a position relationship between the head detection box and the set area according to a second image, where the second image is an image prior to the first image; and in response to that the head detection box of the target object is outside of the outer bounding box of the set area, determine that the position relationship between the head detection box and the set area indicates that the target object is not in the set area.

Optionally, the traffic statistics module is further configured to:

in response to that a position relationship between the head detection box of the target object and a set area in the second image indicates the target object being in the set area, determining that the position relationship between the head detection box of the target object and the set area in the first image indicates that the target object is in the set area; and in response to that the position relationship between the head detection box of the target object and the set area in the second image indicates the target object being not in the set area, determining that the position relationship between the head detection box of the target object and the set area in the first image indicates that the target object is not in the set area.

Optionally, the apparatus further includes an area setting module, the area setting module is configured to:

obtain a setting request of a set area; and perform a corresponding setting processing on the set area according to the setting request, where the setting processing includes at least one of an opening processing for the set area, a closing processing for the set area, a setting processing for an opening time period corresponding to the set area, or a setting processing for an interval between the outer bounding box and the inner bounding box.

Optionally, a bounding box corresponding to the set area comprises a first bounding line and a second bounding line, wherein the first bounding line is one side of the set area which is preset based on a direction for entering the target place such that the target place can be entered by way of the first bounding line; the second bounding line is one side of the set area which is preset based on a direction for leaving the target place such that the target place can be left by way of the second bounding line, and the first bounding line is opposite to the second bounding line;

the traffic statistics module is further configured to:

in response to that two adjacent position determination results are different, obtain a bounding line through which the target object recently passes, where the bounding line is the first bounding line or the second bounding line; and determine the behavior state of the target object according to the bounding line and the two adjacent position determination results.

Optionally, the traffic statistics module is further configured to:

in response to that the bounding line is the first bounding line and the two adjacent position determination results successively indicate the target object entering the set area and un-entering the set area, determining that the behavior state of the target object is entering the target place;

and/or in response to that the bounding line is the second bounding line and the two adjacent position determination results successively indicate the target object entering the set area and un-entering the set area, determine that the behavior state of the target object is leaving the target place.

Optionally, the apparatus further includes an object identifier determining module, the object identifier determining module is configured to:

obtain characteristic information of the respective target objects in the first image;

determine an object identifier corresponding to each of the respective target objects according to the characteristic information; and display the object identifier of the target object on the first image.

Optionally, the object identifier determining module is further configured to:

in response to that the target object is an object appearing for a first time, assign one or more object identifiers other than the object identifier included in the first image to the target object, and store a corresponding relationship between the characteristic information of the target object with the one or more object identifiers in a preset table; and in response to that the target object is not the object appearing for the first time, obtain the object identifier of the target object from the preset table according to the characteristic information of the target object.

Optionally, the object identifier determining module is further configured to:

for the target object to which the one or more object identifiers have been assigned, in response to position relationships in greater than a second set number of continuous frames not detecting the target object, delete the corresponding relationship between the characteristic information of the target object with the one or more object identifiers from preset table.

According to a third aspect of the present disclosure, there is provided a computer device, including:

a processor;

a memory for storing instructions executable by the processor, where the processor is configured to:

obtain a first image of a target place;

perform body detection on the first image to obtain body detection boxes of respective target objects in the first image, where the body detection boxes indicate body areas of the respective target objects;

for each target object of the respective target objects, determine a head detection box of the target object according to the body detection box of the target object, where the head detection box indicates a head area of the target object; and obtain a traffic statistics result of the target place according to head detection boxes of the respective target objects.

According to the fourth aspect of the present disclosure, there is provided a non-transitory computer readable storage medium storing computer executable instructions thereon, where when the computer executable instructions are executed by one or more processors, the traffic statistics collection method described in the first aspect and various possible designs of the first aspect above is implemented.

According to the fifth aspect of the present disclosure, there is provided a computer program product including a computer program, where when the computer program is executed by a processor, the traffic statistics collection method described in the first aspect and various possible designs of the first aspect above is implemented.

In the present disclosure, when performing traffic statistics collection on one or more target objects in the target place, the first image of the target place is obtained, and body detection is performed on the first image to determine the body detection boxes of respective target objects in the first image, where each of the body detection boxes indicates a body area of each of the respective target objects. The head detection box of the target object is obtained according to the body detection box of the target object through prediction, so that the predicted head detection box of the target object (i.e., a pseudo head detection box) can be used to perform the traffic statistics collection to obtain the number of target objects entering and/or leaving the target place, thereby realizing the traffic statistics of the target place. Since the traffic statistics collection of the present disclosure is performed on the pseudo head detection box, when performing the traffic statistics collection based on the body detection box, false detection caused by relatively large area and easy jitter of the body detection box can be avoided. Meanwhile, the pseudo head detection box instead of an actual head area of the target object (i.e., an actual head detection box) is used in the present disclosure to perform the traffic statistics collection, since the area of the body area of the target object is relatively large, the body area of the target object is less affected by light or environment, and it is easy to be detected, thereby effectively avoiding missed detection of the head of the target object, realizing the accurate statistics of traffic data, and improving the accuracy of traffic statistics.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

DETAILED DESCRIPTION OF THE EMBODIMENTS

The technical solutions in the embodiments of the present disclosure will be described clearly and completely below in combination with the drawings in the embodiments of the present disclosure. Obviously, the described embodiments are only part of the embodiments of the present disclosure, not all of them. Based on the embodiments in the disclosure, all other embodiments obtained by ordinary technicians in the art without doing creative work belong to the scope of the disclosure.

Figure 1:
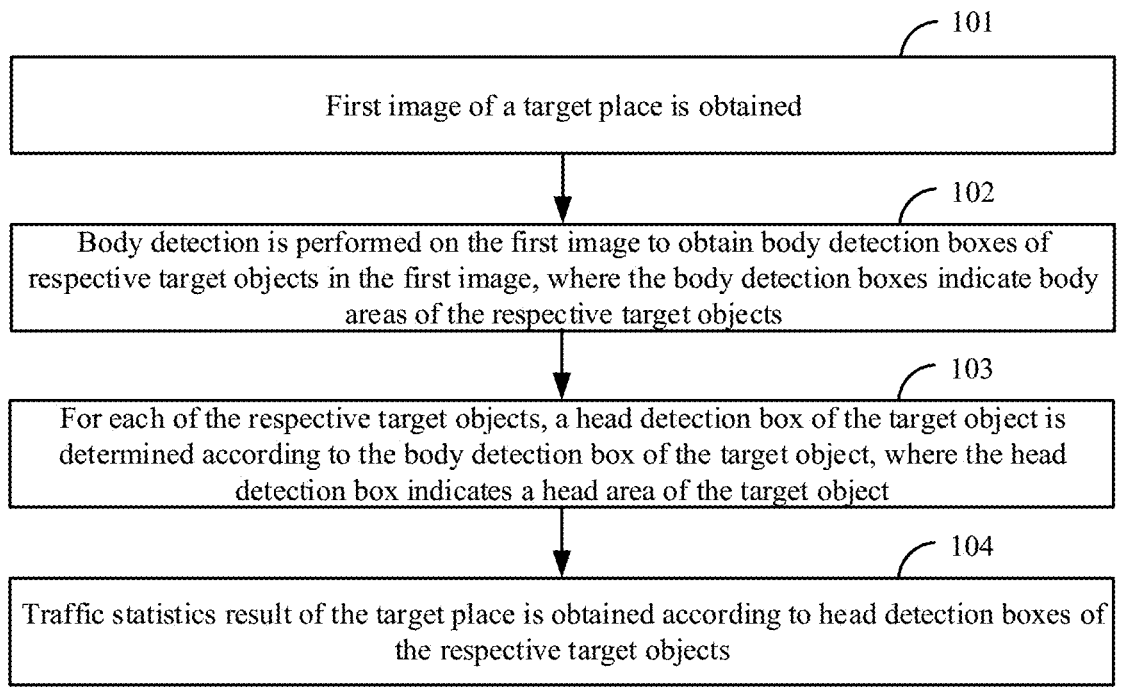
FIG. 1 is a flowchart illustrating a traffic statistics collection method according to an exemplary embodiment of the present disclosure.

As shown in FIG. 1, FIG. 1 is a flowchart illustrating a traffic statistics collection method according to an exemplary embodiment of the present disclosure. The method includes the following steps.

S101, a first image of a target place is obtained.

In this embodiment, when it is necessary to perform traffic statistics on the target place, one or more images containing a specific location of the target place (for example, an entrance, an exit, an entrance, and the like) can be obtained and used as a first image, so that traffic data of one or more target objects in the target place can be determined based on the first image.

One or more camera devices can shoot a specific position in the target place to obtain one or more videos corresponding to the one or more camera devices. When it is necessary to determine a traffic in or out of the target place within a set time, the videos captured within the set time can be obtained, so that the traffic in or out of the target place can be determined by using one or more images in the videos. Specifically, each of the video is an image sequence, and the first image is a frame of image in the image sequence.

Optionally, a statistics time can also be set, that is, an image sequence captured within the set time can be obtained, so that a traffic statistics result of the target objects in the target place within the set time can be calculated by using the image sequence.

Optionally, the target object is a person. Certainly, the target object can also be other movable objects with heads (i.e., faces), and the present disclosure is not limited to this. For the convenience of description, taking the person as the target object the following description.

S102, body detection is performed on the first image to obtain body detection boxes of respective target objects in the first image, where the body detection boxes indicate body areas of the respective target objects.

In this embodiment, body detection is performed on the first image to determine the body areas of the respective target objects (i.e., one or more body areas of one or more target objects) in the first image, so as to obtain the body detection boxes of the respective target objects, where the body detection boxes indicate an entire body tissue of the respective target objects.

Figure 2:
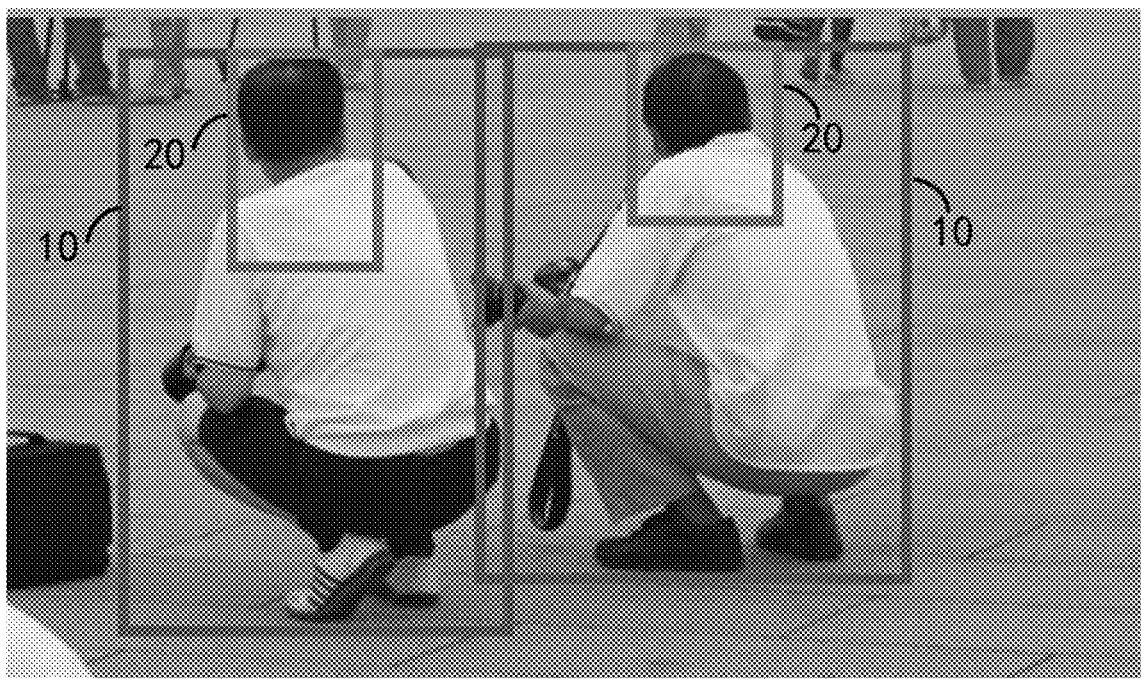
FIG. 2 is a schematic diagram illustrating a detection box according to an exemplary embodiment of the present disclosure.

Optionally, a target detection model is used to perform body detection on the first image, so as to obtain the body detection boxes of the respective target objects in the first image (for example, body detection boxes 10 shown in FIG. 2). The target detection model is a trained machine learning model, which can accurately determine body parts of the respective target objects, so as to obtain the body detection boxes of the respective target objects.

Specifically, the first image is input to the target detection model, so that body detection can be performed on the first image by using the target detection model, and a processed first image can be output, where the processed first image is an image drawn with one or more body detection boxes.

Optionally, the target detection model includes machine learning models such as yolov5, SSD and YOLOX.

S103, for each target object of the respective target objects, a head detection box of the target object is determined according to the body detection box of the target object, wherein the head detection box indicates a head area of the target object.

In this embodiment, for each target object in the first image, the head area of the target object can be obtained based on the body detection box of the target object through prediction, and then a corresponding head detection box (for example, a head detection box 20 shown in FIG. 2) can be drawn to obtain a pseudo head detection box of the target object.

The predicted head area obtained based on the body detection box may not be an actual head area of the target object. When a body detection box is obtained, a head detection box can be obtained through prediction.

S104, a traffic statistics result of the target place is obtained according to head detection boxes of the respective target objects.

In this embodiment, after obtaining the head detection boxes of the respective target objects in the first image through prediction, one or more target objects entering and/or leaving the target place can be determined based on the head detection boxes of the respective target objects, that is, pseudo head detection boxes, and thus traffic data of the target objects in or out of the target place can be determined, and the traffic statistics result of the target place can be obtained, thereby realizing the accurate statistics of the traffic data of the target place.

In this embodiment, since the area of the body part of the target object is larger than that of the head part, compared with the actual head part of the target object directly detected, it is less affected by factors such as light and environment, that is, the probability of successful detection is relatively high, and thus missed detection can be can effectively avoided. Meanwhile, since the body detection box is not stable enough, and will change after the target object performs some actions (for example, reaching out, raising arms, and the like), resulting in inaccurate detection, and further resulting in relatively low accuracy of traffic statistics. Compared with traffic statistics directly collected by using the body detection box, the accuracy of traffic statistics can ensured by using the pseudo head detection box for traffic statistics.

In some embodiments, the body detection box and the head detection box of the target object are detected at the same time, and then a correlation between the body detection box and the head detection box is performed through an algorithm. However, when the correlation is performed, the body and head will be mismatched due to mutual occlusion of the target objects. For example, a head detection box of a target object is mismatched with a body detection box of a target object in front of the target object, resulting in false detection of the target object, and further resulting in relatively low accuracy of traffic statistics result. However, in the present disclosure, the head detection box is obtained based on the body detection box through prediction, which will not cause such mismatch, thereby ensuring the detection accuracy of the target object, and ensuring the accuracy of traffic statistics result.

As can be seen from above description, when performing traffic statistics collection on one or more target objects in the target place, the first image of the target place is obtained, and body detection is performed on the first image to determine the body detection boxes of respective target objects in the first image, where each of the body detection boxes indicates a body area of each of the respective target objects. The head detection box of the target object is obtained according to the body detection box of the target object through prediction, so that the predicted head detection box of the target object (i.e., a pseudo head detection box) can be used to perform the traffic statistics collection to obtain the number of target objects entering and/or leaving the target place, thereby realizing the traffic statistics of the target place. Since the traffic statistics collection of the present disclosure is performed on the pseudo head detection box, when performing the traffic statistics collection based on the body detection box, false detection caused by relatively large area and easy jitter of the body detection box can be avoided. Meanwhile, the pseudo head detection box instead of an actual head area of the target object (i.e., an actual head detection box) is used in the present disclosure to perform the traffic statistics collection, since the area of the body area of the target object is relatively large, the body area of the target object is less affected by light or environment, and it is easy to be detected, thereby effectively avoiding missed detection of the head of the target object, realizing the accurate statistics of traffic data, and improving the accuracy of traffic statistics.

Figure 3:
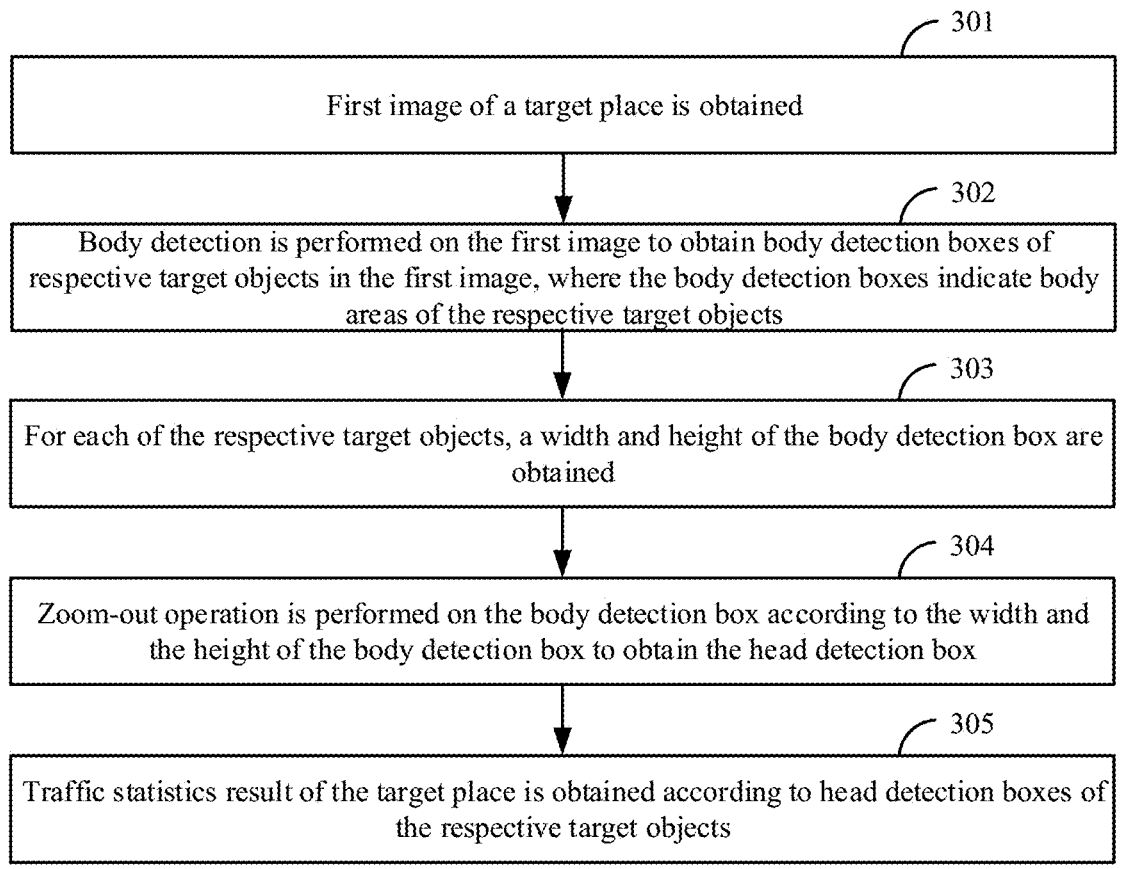
FIG. 3 is a flowchart illustrating a traffic statistics collection method according to an exemplary embodiment of the present disclosure.

As shown in FIG. 3, FIG. 3 is a flowchart illustrating a traffic statistics collection method according to an exemplary embodiment of the present disclosure. This embodiment describes a processing process of how to obtain a head area in the detected body detection box through prediction on the basis of the aforementioned embodiment. The process will be described in detail below in combination with a specific embodiment. As shown in FIG. 3, the method includes the following steps.

S301, a first image of a target place is obtained.

S302, body detection is performed on the first image to obtain body detection boxes of respective target objects in the first image, where the body detection boxes indicate body areas of the respective target objects.

S303, for each target object of the respective target objects, a width and a height of the body detection box are obtained.

S304, a zoom-out operation is performed on the body detection box according to the width and the height of the body detection box to obtain the head detection box.

In this embodiment, for each target object in the first image, the width and the height of the body detection box are obtained. Based on the width and the height of the body detection box of the target object, the zoom-out operation is performed on the body detection box to obtain the head detection box of the target object, thereby realizing the determination of the pseudo head detection box.

The width of the body detection box indicates a width of the target object, and the height of the body detection box indicates a height of the target object.

Optionally, when performing the zoom-out operation on the body detection box of the target object according to the width and the height of the body detection box of the target object to determine the pseudo head detection box of the target object, an aspect ratio of the body detection box is determined according to the width and the height of the body detection box, and a target ratio range to which the aspect ratio of the body detection box belongs is obtained, where the target ratio range is determined based on a human body posture of the target object. Further, a height reduction ratio corresponding to the target ratio range is obtained, and the zoom-out operation is performed on the body detection box in a height direction based on the height reduction ratio.

Specifically, for each target object in the first image, a ratio of the width and the height of the body detection box of the target object is calculated to obtain the aspect ratio of the body detection box of the target object. A preset ratio range to which the aspect ratio of the body detection box belongs can be searched, and then the preset ratio range to which the aspect ratio belongs can be taken as the target ratio range. The height reduction ratio corresponding to the target ratio range can be searched, so that the zoom-out operation can be performed on the body detection box in the height direction based on the height reduction ratio to obtain the head detection box. For example, if the height reduction ratio is 1/7, a height of the head detection box obtained by performing the zoom-out operation is 1/7 of the height of the body detection box.

The preset ratio range is determined based on a human body posture. The human body posture includes one or more of a standing posture, a non-standing posture and a specific posture. Each human body posture corresponds to a preset ratio range. When the human body posture of the person is different, the height of the head part occupying the whole body part is different, that is, the height reduction ratio is different. Therefore, each preset ratio range has a corresponding height reduction ratio, that is, each human body posture corresponds to a height reduction ratio.

Specifically, when the target ratio range is a preset ratio range corresponding to the standing posture, it indicates that the target object is in a standing state, the height reduction ratio corresponding to the standing posture can be obtained from a relevant mapping table, so as to perform the zoom-out operation on the body detection box of the target object in the height direction based on the height reduction ratio to obtain the head detection box of the target object.

Figure 4:
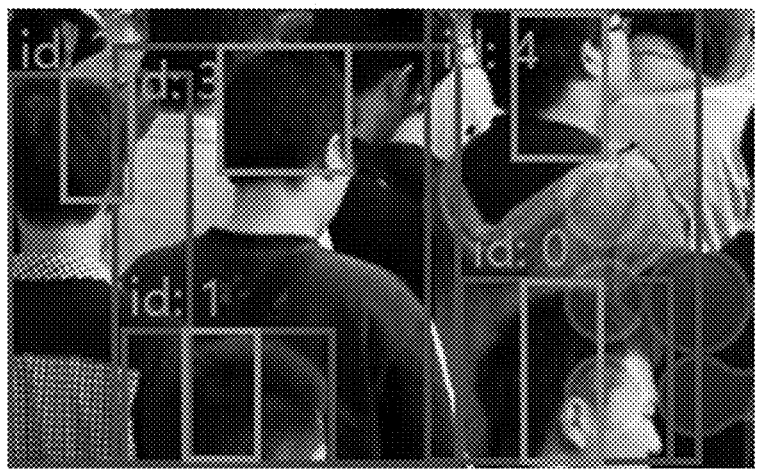
FIG. 4 is a schematic diagram illustrating a detection box according to an exemplary embodiment of the present disclosure.

The preset ratio range and height reduction ratio corresponding to different human body postures can be set according to the actual situation. For example, the preset ratio range corresponding to the standing posture ranges from 0 to 1/4, and when the person is in the standing state, the head occupies 1/7 of the height of the human body, that is, a head-to-body ratio is 1/7, and thus the height reduction ratio corresponding to the standing posture can be 1/7. The preset ratio range corresponding to the non-standing posture (for example, riding a bike, squatting shown in FIG. 2, and the like) is greater than 1/4 and less than 1, and the height reduction ratio corresponding to the non-standing posture is 1/3. The preset ratio range corresponding to the specific posture (for example, a lying posture, a truncated posture of the target object with id 1 in FIG. 4, and the like) is greater than or equal to 1, since the height of the body is relatively low when the person is in the specific posture, the height of the body detection box can be directly taken as the height of the head detection box, and correspondingly, the height reduction ratio corresponding to the specific posture is 1.

Optionally, when determining the head detection box, the width of the head detection box can also be determined. Since the human body posture has relatively little impact on the width of the human body, the zoom-out operation can be performed on the body detection box in a width direction based on a preset width reduction ratio.

The preset width reduction ratio is obtained through research by relevant personnel. The head detection box obtained by performing the zoom-out operation on the body detection box in the width direction based on the preset width reduction ratio has a high degree of matching with the actual head area of the target object, thereby avoiding false statistics caused by the head detection box being too large or too small. Meanwhile, since the zoom-out operation is directly performed according to the preset width reduction ratio, a speed of determining the head detection box can be improved.

Optionally, the width reduction ratio can also be determined according to the aspect ratio of the body detection box, and the zoom-out operation is performed on the body detection box in the width direction based on the width reduction ratio. The process of determining the width reduction ratio based on the aspect ratio is similar to the process of determining the height reduction ratio based on the aspect ratio, which will not be repeated here.

In this embodiment, a pseudo face detection box of the target object can be determined based on the aspect ratio of the body detection box of the target object, so as to collect the traffic statistics by using the pseudo face detection box. Compared with the traffic statistics collected by using an actual face box obtained by performing face detection, since body features are more obvious than face features, the present disclosure can avoid missed detection of the target object caused by some reasons (for example, the head of the target object is blocked by wearing a hat, helmet, umbrella, and the like, the light is dark, and the like). Further, the pseudo face detection box is determined based on the aspect ratio of the body detection box, that is, the pseudo face detection box is determined based on the body posture of the target object, therefore, a position and size of the determined pseudo face detection box are also accurate, so that the traffic statistics can be accurately collected by using the pseudo face detection box, thereby ensuring the accuracy of the traffic statistics result of the target place.

S305, a traffic statistics result of the target place is obtained according to head detection boxes of the respective target objects.

In this embodiment, for each target object in the first image, a behavior state of the target object is determined according to a position relationship between the head detection box of the target object and a set area in the first image of the target place, where the behavior state of the target object indicates whether the target object enters or leaves the target place; and the traffic statistics result of the target place is determined according to the behavior state of the target object.

The traffic statistics result includes an entry traffic statistics result and/or an exit traffic statistics result. The entry traffic statistics result indicates the number of target objects entering the target place, and the exit traffic statistics result indicates the number of target objects leaving the target place.

In this embodiment, it is determined whether the target object enters or leaves the target place according to a position relationship between the head detection box of the target object and a set area of the target place, to obtain a behavior state of the target object. The number of target objects whose behavior states indicate to enter the target place is obtained, so as to obtain the entry traffic statistics result of the target place; and/or the number of target objects whose behavior states indicate to leave the target place is obtained, so as to obtain the exit traffic statistics result of the target place.

Specifically, the entry traffic statistics result indicates the number of the target objects entering the target place within the set time, and the exit traffic statistics result indicates the number of the target objects leaving the target place within the set time. Correspondingly, when determining the entry traffic statistics result, the number of the target objects whose behavior states determined within the set time indicate that they enter the target place is obtained, so as to obtain the entry traffic statistics result. When determining the exit traffic statistics result, the number of target objects whose behavior states determined within the set time indicate that they leave the target place is obtained, so as to obtain the exit traffic statistics result.

Optionally, determining the behavior state of the target object according to the position relationship between the head detection box of the target object and the set area in the first image of the target place includes:

determining a position determination result for the target object according to the position relationship between the head detection box of the target object and the set area in the first image of the target place; where the position determination result indicates whether the target object enters the set area; and determining the behavior state of the target object according to the position determination result.

Specifically, when detecting the first image, the first image is taken as a current image, and a moment corresponding to the first image (i.e., a moment when the first image is captured) is taken as a current moment. For each target object in the first image, it is determined whether the target object enters the set area at the current moment according to the position relationship between the target object and the set area in the first image, so as to obtain the position determination result of the current moment for the target object. Since it is necessary to determine whether the target object enters or leaves the target place according to a persistent behavior of the target object, the behavior state of the target object is determined based on the position determination results of the target object in multiple frames of images, that is, after the position determination result at the current moment is obtained, the behavior state of the target object is determined by combining the position determination results of other frames of images.

Optionally, the position relationship indicates whether the target object is in the set area. Correspondingly, determining the position determination result for the target object according to the position relationship between the head detection box of the target object and the set area in the first image of the target place includes:

in response to that position relationships in more than a first set number of continuous frames indicate the target object being in the set area, determining that the position determination result for the target object indicates that the target object enters the set area.

Specifically, for each target object in the first image, it is determined whether the target object is in the set area of the first image. If the target object is in the set area, the number of image frames of the target object continuously in the set area is obtained. When the number of image frames is greater than the first set number, it indicates that the target object enters the set area, and then the position determination result of the target object in the first image is determined, that is, the position determination result at the current moment indicates that the target object enters (namely, passes through) the set area.

In addition, for each target object in the first image, when the target object is also in a next frame of image of the first image, the position determination result of the target object in the first image is taken as a position determination result of the target object at a previous moment, that is, the position determination result of the target object in the first image is left shifted. When the target object is also in the set area, the number of image frames of the target object continuously in the set area is updated, that is, the number of image frames of the target object continuously in the set area is increased by 1. If the updated number of image frames of the target object continuously in the set area is greater than the first set number, it is determined that the position determination result of the target object at the current moment indicates that the target object enters the set area.

When the updated number of image frames of the target object continuously in the set area is less than or equal to the first set number, the position determination result of the target object at the previous moment is taken as the position determination result of the target object at the current moment, and a next frame of image is continuously traversed, so as to avoid false detection caused by the target object straying into the set area.

When the target object is not in the set area, the number of image frames of the target object continuously not in the set area is updated, that is, the number of image frames of the target object continuously not in the set area is increased by 1. If the updated number of image frames of the target object continuously not in the set area is greater than a second set number, it indicates that the target object has disappeared, and the number of image frames of the target object continuously in the set area is updated to 0.

In addition, optionally, when it is determined that the number of image frames of the target object continuously in the set area is greater than the first set number, the number of image frames of the target object continuously not in the set area is updated to 0.

In this embodiment, when the first set number is greater than 1, the position determination result for the target object is determined according to position relationships of the target object in the multiple frames of images, thereby ensuring the accuracy of the determined position determination result.

Optionally, the bounding box of the set area can be a single layer, or in order to prevent jitter and improve the accuracy of traffic statistics, the bounding box of the set area can also be set to a plurality of layers, for example, a double layer, three layers, and the like. Hereinafter, taking a double-layer bounding box as an example, the determination of the position relationship of the target object will be described.

Figure 5:
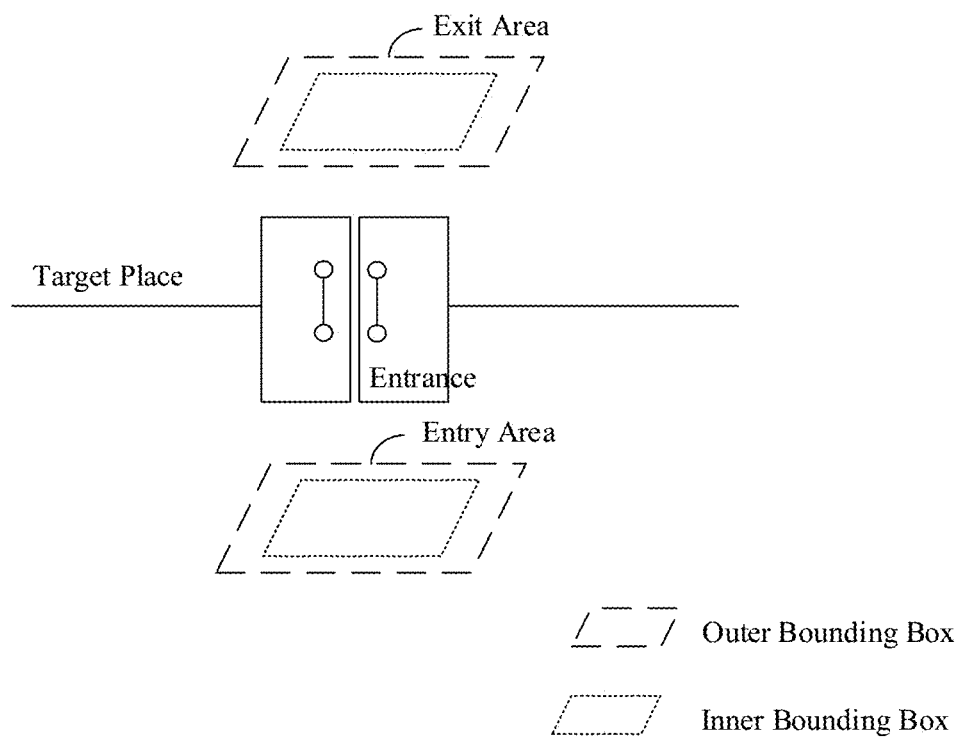
FIG. 5 is a schematic diagram illustrating a setting area according to an exemplary embodiment of the present disclosure.

When the bounding box of the set area is the double layer, the bounding box of the set area includes an outer bounding box and an inner bounding box (for example, an outer bounding box and an inner bounding box shown in FIG. 5). In response to that the head detection box of the target object is within the inner bounding box of the set area, it is determined that the position relationship between the head detection box and the set area indicates that the target object is in the set area; in response to that the head detection box of the target object is between the inner bounding box and the outer bounding box of the set area, a position relationship between the head detection box and the set area is determined according to a second image, where the second image is an image prior to the first image; and in response to that the head detection box of the target object is outside of the outer bounding box of the set area, it is determined that the position relationship between the head detection box and the set area indicates that the target object is not in the set area.

Specifically, for each target object in the first image, when the head detection box of the target object is all in an area within the inner bounding box of the set area, it is directly determined that the position relationship between the head detection box of the target object and the set area indicates that the target object is in the set area. When the head detection box of the target object is all in an area outside of the outer bounding box of the set area, it is directly determined that the position relationship between the head detection box and the set area indicates that the target object is not in the set area. When the head detection box of the target object is between the inner bounding box and the outer bounding box of the set area, it indicates that the head detection box of the target object is not all within the inner bounding box or outside of the outer bounding box, that is, the set area may be erroneously entered or left due to the jitter of the head detection box, and the position relationship of the target object is determined by combining the second image captured before the first image, therefore, the position relationship of the target object can be accurately determined, and the accuracy of the determined behavior state of the target object can be ensured.

Optionally, when determining the position relationship between the head detection box of the target object in the first image and the set area in combination with the second image, if the position relationship between the head detection box of the target object and a set area in the second image indicates that the target object is in the set area, it is determined that the position relationship between the head detection box of the target object and the set area in the first image indicates that the target object is in the set area. If the position relationship between the head detection box of the target object and the set area in the second image indicates that the target object is not in the set area, it is determined that the position relationship between the head detection box of the target object and the set area in the first image indicates that the target object is not in the set area.

Optionally, the second image can be a previous frame of image of the first image, or can be an image with a certain number of intervals from the first image. For example, if the number is 1, the second image is a previous frame of image of the previous frame of image of the first image.

Optionally, there may be one or more set areas. When there is a plurality of set areas, the behavior state of the target object can be determined according to the position determination results of the target object in the plurality of set areas. Hereinafter, taking two set areas as an example, the determination of the behavior state of the target object according to the position determination results of the target object in the two set areas will be described.

Specifically, when there are two set areas, the set areas include an entry area and an exit area. The arrangement of the entry area and the exit area can be arranged according to a path for entering the target place. For example, as shown in FIG. 5, an entry area is outside of an entrance of the target place, and an exit area is within the entrance of the target place. Correspondingly, determining the behavior state of the target object according to the position determination result includes:

in response to that two adjacent position determination results successively indicate the target object passing through the entry area and the exit area, determining that the behavior state indicates entering the target place; and/or in response to that two adjacent position determination results successively indicate the target object passing through the exit area and passing through the entry area, determining that the behavior state indicates leaving the target place.

Specifically, for each target object in the first image, when determining that the two adjacent position determination results of the target object successively indicate that the target object passes through the entry area and the exit area indicates that the target object continues to enter the exit area after entering the entry area, it is determined that the behavior state of the target object indicates that the target object enters the target place.

When determining that the two adjacent position determination results of the target object successively indicate that the target object passes through the exit area and the entry area indicates that the target object continues to pass through the entry area after passing through the exit area, it is determined that the behavior state of the target object indicates that the target object leaves the target place.

Optionally, one of the two adjacent position determination results indicates the position determination result of the determined target object in the previous frame of image, and the other position determination result indicates the position determination result of the determined target object in the current image (i.e., the first image).

Optionally, the two adjacent position determination results can be represented by corresponding identifiers. For example, when the position determination result indicates that the target object passes through the entry area, it is determined that the position determination result is a first identifier; when the position determination result indicates that the target object passes through the exit area, it is determined that the position determination result is a second identifier; and when the position determination result indicates that the target object does not pass through the set area (that is, the target object neither passes through the entry area nor the exit area), it is determined that the position determination result is a third identifier.

Figure 6:
FIG. 6 is a schematic diagram illustrating a setting area according to an exemplary embodiment of the present disclosure.

Optionally, an identifier corresponding to the position determination result can also be an identifier corresponding to the set area. For example, as shown in FIG. 6, an entry area is an area 1, and an identifier corresponding to the area 1 is 1; an exit area is an area 2, and an identifier corresponding to the area 2 is 2, therefore, the first identifier is 1, and the second identifier is 2.

Optionally, the two adjacent position determination results can be stored in a form of an array, that is, a first element in the array represents that the target object is in the previous frame of image, i.e., the position determination result at the previous moment; and a second element in the array represents that the target object is in the first image, i.e., the position determination result at the current moment.

Figure 7:
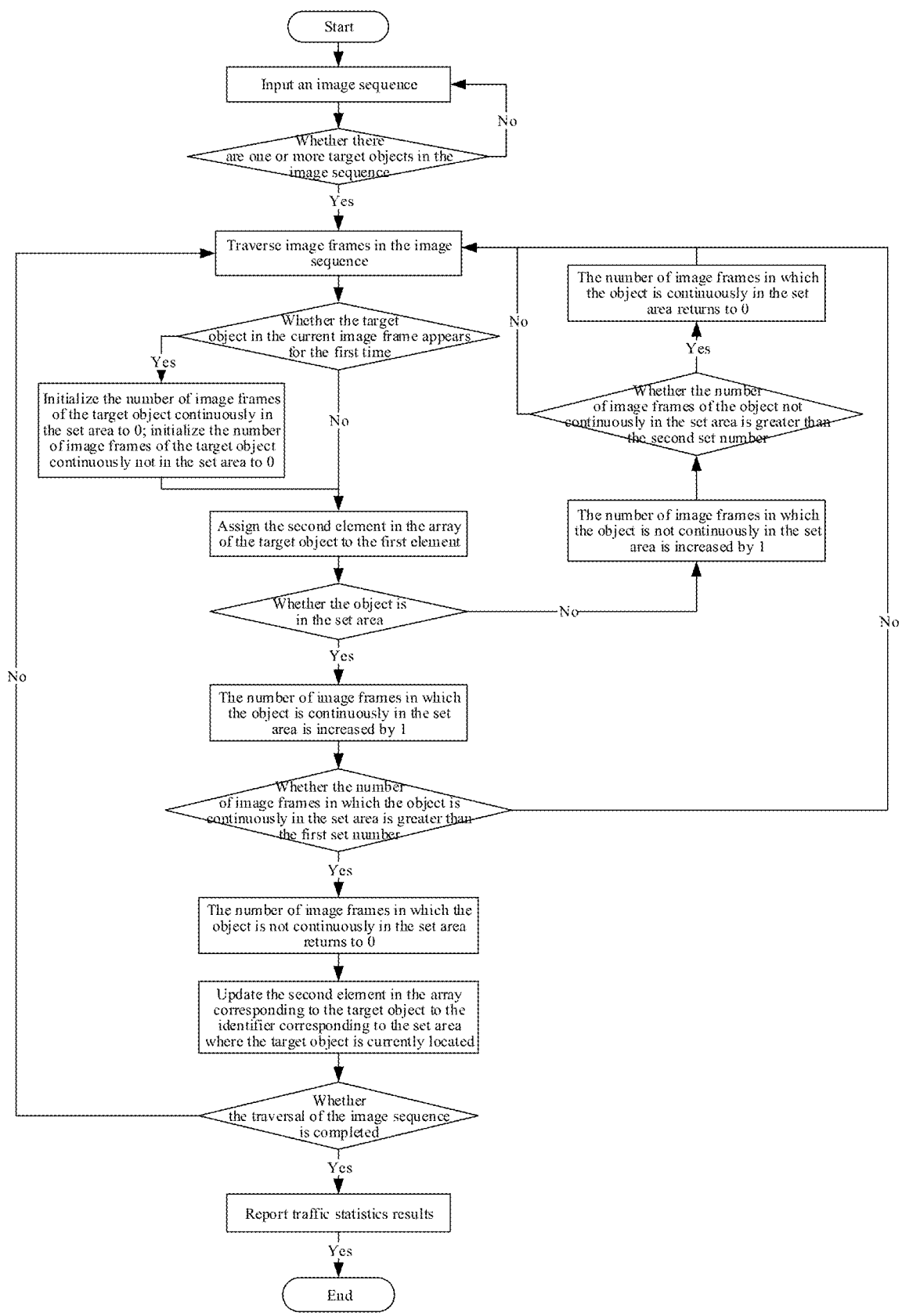
FIG. 7 is a schematic diagram illustrating a traffic statistics process according to an exemplary embodiment of the present disclosure.

Taking a specific application scenario as an example, a flowchart shown in FIG. 7 is taken as an example to describe a process of traffic statistics. A first set number is 2, an image sequence includes 6 frames of images, an identifier of an entry area is 1, an identifier of an exit area is 2, and a second set number is 2. For each target object in a first frame of image, since the target object appears for a first time, a number of image frames in which the target object is continuously in the set area is initialized to 0, and the number of image frames in which the target object is continuously not in the set area is initialized to 0, and the position determination result of the target object at the previous moment is a third identifier (i.e., 0). If the target object is in the entry area, the number of image frames of the target object continuously in the set area is updated, and the updated number of image frames of the target object continuously in the set area is 1. Since the updated number of image frames of the target object is not greater than the first set number, the position determination result of the target object at the previous moment is still taken as the position determination result of the target object at the current moment, that is, the position determination result of the target object in the first frame of image. Correspondingly, the array for the target object in the first frame of image is (0, 0), and a second frame of image in the image sequence is continuously detected.

When the target object also appears in the second frame of image, if the target object is in the entry area, and the updated number of image frames of the target object continuously in the set area is 2, which is still not greater than the first set number, the array for the target object in the second frame of image is (0, 0), and a third frame of image in the image sequence is continuously detected.

When the target object also appears in the third frame of image, if the target object is in the entry area, and the updated number of image frames of the target object continuously in the set area is 3, which is greater than the first set number. Since the target object is currently in the entry area, the position determination result of the target object at the current moment can be determined, that is, the position determination result in the third frame of image indicates that the target object enters the entry area. Correspondingly, the array for the target object in the third frame of image is (0, 1), the number of image frames of the target object continuously not in the set area is updated to 0, and a fourth frame of image in the image sequence is continuously detected.

When the target object also appears in the fourth frame of image, the position determination result of the target object at the previous moment is the position determination result of the target object in the third frame of image, that is, the second element of the target object is assigned to the first element. If the target object is still in the entry area, the updated number of image frames of the target object continuously in the set area is 4, which is greater than the first set number. Since the target object is currently in the entry area, the position determination result of the target object at the current moment can be determined, that is, the position determination result in the fourth frame of image indicates that the target object enters the entry area. Correspondingly, the array for the target object in the fourth frame of image is (1, 1), and a fifth frame of image in the image sequence is continuously detected.

When the target object also appears in the fifth frame of image, the position determination result of the target object at the previous moment is the position determination result of the target object in the fourth frame of image. If the target object is still in the entry area, the updated number of image frames of the target object continuously in the set area is 5, which is greater than the first set number. Since the target object is currently in the entry area, the position determination result of the target object at the current moment can be determined, that is, the position determination result in the fifth frame of image indicates that the target object enters the entry area. Correspondingly, the array for the target object in the fifth frame of image is (1, 1), and a sixth frame of image in the image sequence is continuously detected.

When the target object also appears in the sixth frame of image, the position determination result of the target object at the previous moment is the position determination result of the target object in the fifth frame of image. If the target object is in the exit area, the updated number of image frames of the target object continuously in the set area is 6, which is greater than the first set number. Since the target object is currently in the exit area, the position determination result of the target object at the current moment can be determined, that is, the position determination result in the sixth frame of image indicates that the target object enters the exit area. Correspondingly, the array for the target object in the sixth frame of image is (1, 2), and the behavior state of the target object indicates that the target object enters the target place.

In this embodiment, by setting the entry area and the exit area, and determining the behavior state of the target object based on whether the target object continuously passes through the entry area and the exit area, the accuracy of the determined behavior state of the target object can be ensured. Compared with the existing method of determining the behavior state of the target object through a single set area, false determination of the behavior state caused by various situations can be avoided, thereby avoiding false statistics of the target object. For example, when the target object enters the single set area, it is determined that the target object enters the target place, but the target object immediately leaves the set area. At this time, it is determined that the target object leaves the target place, that is, when the target object keeps entering and leaving the set area, that is, the target object keeps wandering at the entrance of the target place, but does not actually enter the target place, resulting in repeated statistics of the target object, and then resulting in relatively low accuracy of traffic statistics. However, when the behavior state of the target object is determined based on the entry area and the exit area, this situation can be avoided, thereby ensuring the accuracy of traffic statistics.

Optionally, when there is one set area, a bounding box corresponding to the set area includes a first bounding line and a second bounding line. The first bounding line is one side of the set area which is preset based on a direction for entering the target place such that the target place can be entered by way of the first bounding line. The second bounding line is one side of the set area which is preset based on a direction for leaving the target place such that the target place can be left by way of the second bounding line. The first bounding line is opposite to the second bounding line.

Correspondingly, determining the behavior state of the target object according to the position determination result includes:

in response to that two adjacent position determination results are different, obtaining a bounding line through which the target object recently passes, where the bounding line is the first bounding line or the second bounding line; and determining the behavior state of the target object according to the bounding line and the two adjacent position determination results.

Specifically, when it is determined that two adjacent position determination results of the target object are different, it indicates that the target object successively enters or leaves the set area, and the target object may enter or leave the target place; further, the bounding line of the set area through which the target object recently passes is obtained, so as to determine whether the target object enters or leaves the target place based on the bounding line.

Optionally, determining the behavior state of the target object according to the bounding line and the two adjacent position determination results includes:

in response to that the bounding line is the first bounding line and the two adjacent position determination results successively indicate the target object entering the set area and un-entering the set area, determining that the behavior state of the target object is entering the target place;

and/or in response to that the bounding line is the second bounding line and the two adjacent position determination results successively indicate the target object entering the set area and un-entering the set area, determining that the behavior state of the target object is leaving the target place.

Figure 8:
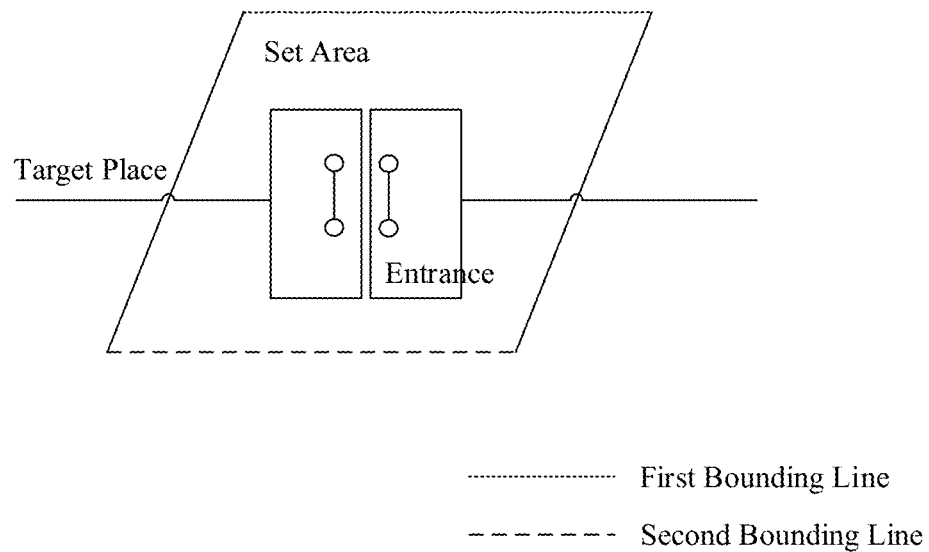
FIG. 8 is a schematic diagram illustrating a setting area according to an exemplary embodiment of the present disclosure.

Specifically, as shown in FIG. 8, the first bounding line is a bounding line of the set area within an entrance of the target place, and the second bounding line is a bounding line of the set area outside of the entrance of the target place. When a bounding line through which the target object recently passes is the first bounding line, if the two adjacent position determination results successively indicate the target object entering the set area and un-entering the set area, it indicates that the target object enters an area outside of the set area in the target place from the set area, and the behavior state of the target object is determined as entering the target place. Similarly, when the bounding line through which the target object recently passes is the second bounding line, if the two adjacent position determination results successively indicate the target object entering the set area and un-entering the set area, it indicates that the target object enters the set area from an area outside of the target place, and the behavior state of the target object is determined as entering the target place.

It can be understood that the setting of the first bounding line and the second bounding line, the shape of the set area and the position of the set area shown in FIG. 8 are only one example, and the present disclosure will not be limited to this.

Optionally, in order to enable a user visually distinguish target objects on the image, object identifiers of the target objects can also be displayed on the first image. The specific display process is: obtaining characteristic information of the respective target objects in the first image; determining an object identifier corresponding to each of the respective target objects according to the characteristic information; and displaying the object identifier of the target object on the first image.

Specifically, characteristic information of respective target objects in the first image can be determined by using relevant algorithms or models. For each target object of respective target objects, a corresponding search result is obtained by searching a preset table based on the characteristic information of the target object. The search result indicates whether the target object appears in the image sequence for the first time, that is, whether the target object appears in images captured by camera devices for the first time. Further, the object identifier of the target object can be determined according to the search result, and the object identifier of the target object can be displayed on the first image (for example, "id: 0" in FIG. 4 indicates that an object identifier of a corresponding target object is 0).

The preset table includes the characteristic information of the target object appearing in the image sequence and object identifiers corresponding to the characteristic information.

Optionally, in order to improve the detection accuracy of the target object, characteristics of the target object such as clothing, which are obviously different from other target objects, can be extracted without using accessory features such as skateboards and umbrellas. Correspondingly, the characteristic information of the target object includes clothing characteristic information of the target object.

Optionally, determining the object identifier corresponding to each of the respective target objects according to the characteristic information includes:

in response to that the target object is an object appearing for a first time, assigning one or more object identifiers other than the object identifier included in the first image to the target object, and storing a corresponding relationship between the characteristic information of the target object with the one or more object identifiers in a preset table; and in response to that the target object is not the object appearing for the first time, obtaining the object identifier of the target object from the preset table according to the characteristic information of the target object.

Specifically, for each target object in the first image, if the characteristic information of the target object can be searched in the preset table, it indicates that the search result for the target object indicates that the target object is not appearing in the image sequence for the first time, that is, the target object does not appear in the images captured by the camera devices for the first time. Further, the object identifier corresponding to the characteristic information of the target object can be searched in the preset table, and the searched object identifier is determined as the object identifier of the target object.

If the characteristic information of the target object cannot be searched in the preset table, it indicates that the search result for the target object indicates that the target object appears in the image sequence for the first time, that is, the target object appears in the images captured by the camera devices for the first time. Further, if the characteristic information of the target object does not exist in the preset table, a new object identifier is assigned to the target object, where the new object identifier is different from the object identifiers of all the characteristic information in the preset table, and then the object identifier of the target object and the characteristic information of the target object are stored in the preset table.

When assigning one or more new object identifiers to one or more target objects, the new object identifiers can be assigned to the target objects based on a preset order. For example, the object identifiers can be a number, and the target objects can be assigned in an ascending order. If the largest object identifier in the preset table is 3, the new object identifier assigned to the target object is 4.

Optionally, when the target object in the image sequence disappears, that is, it does not appear in pictures taken by the camera devices, that is, for the target object to which the one or more object identifiers have been assigned, in response to position relationships in greater than a second set number of continuous frames not detecting the target object, the corresponding relationship between the characteristic information of the target object with the one or more object identifiers can be deleted from preset table to stop tracking and counting the target object. Certainly, when the target object in the image sequence disappears, the object relationship between the characteristic information of the target object and the object identifier can also be retained, which will not be limited here.

Optionally, after deleting the object relationship between the characteristic information of the target object and the object identifier from the preset table, other target object identifiers in the preset table can also be adjusted. Correspondingly, when other target objects exist in the displayed image, the adjusted target object identifiers corresponding to other target objects can be displayed.

When adjusting other target object identifiers in the preset table, the other target object identifiers can be adjusted based on a preset order. For example, if the preset order is an ascending order, the other target object identifiers can be reduced by 1 when making adjustments.

Optionally, the set area can also be set according to actual needs, the specific process of setting the set area is: obtaining a setting request of a set area; and performing a corresponding setting processing on the set area according to the setting request, where the setting processing includes at least one of an opening processing for the set area, a closing processing for the set area, a setting processing for an opening time period corresponding to the set area, or a setting processing for an interval between the outer bounding box and the inner bounding box.

Specifically, when a user wants to open or close a certain set area, a corresponding set area opening request or set area closing request can be input to open or close the set area on the image. The user can also set an opening time of the set area. For example, when the user wants to count the pedestrian traffic in a certain time period, the user can input a corresponding opening time period setting request to open the set area in this time period. When the bounding box of the set area is the double layer, an interval distance between the outer bounding box and the inner bounding box can also be set.

Optionally, when the bounding box of the set area is the double layer, the inner bounding box of the set area can be obtained by shrinking the outer bounding box of the set area based on the interval distance.

Certainly, the user can also set the set area according to the requirements, and the setting processing for the set area will not be limited here.

In this embodiment, the bounding box of the set area can be set to the double layer, and thus false determination of the position relationship of the target object caused by the jitter of the detection box (e.g., the head detection box or the body detection box) for the target object can be avoided, thereby improving the determination accuracy of the position determination result of the target object, and further improving the accuracy of the determined traffic statistics result of the target place.

Corresponding to the aforementioned embodiments of the method, the present disclosure further provides embodiments of an apparatus and a terminal to which the apparatus is applied.

Figure 9:
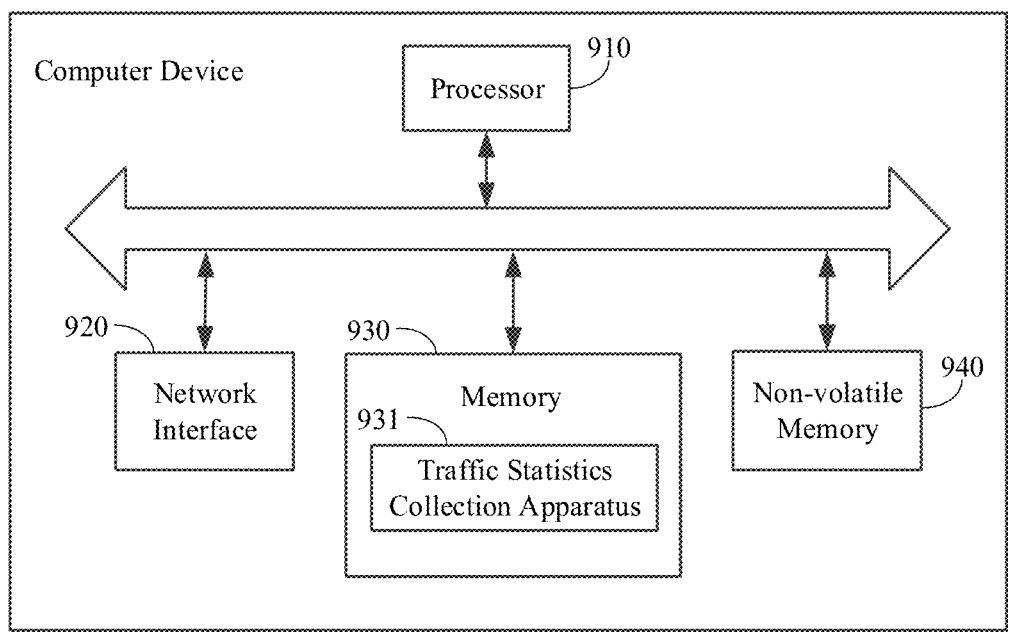
FIG. 9 is a hardware structure diagram illustrating a computer device where a traffic statistics collection apparatus of the present disclosure is located.

The embodiments of the traffic statistics collection apparatus of the present disclosure can be applied to a computer device, for example, a server or a terminal device. The embodiments of the apparatus can be implemented by software, or by hardware or a combination of software and hardware. Taking software implementation as an example, as an apparatus in a logical sense, it is formed by reading the corresponding computer program instructions in the non-volatile memory into the memory through the processor of the computer device where it is located. In terms of hardware, as shown in FIG. 9, FIG. 9 is a hardware structure diagram illustrating a computer device where a traffic statistics collection apparatus of the embodiment of the present disclosure is located. In addition to a processor 910, a memory 930, a network interface 920 and a non-volatile memory 940 shown in FIG. 9, the computer device in which the apparatus 931 is located in the embodiment may generally include other hardware according to the actual functions of the computer device, details of which will not be described herein.

Figure 10:
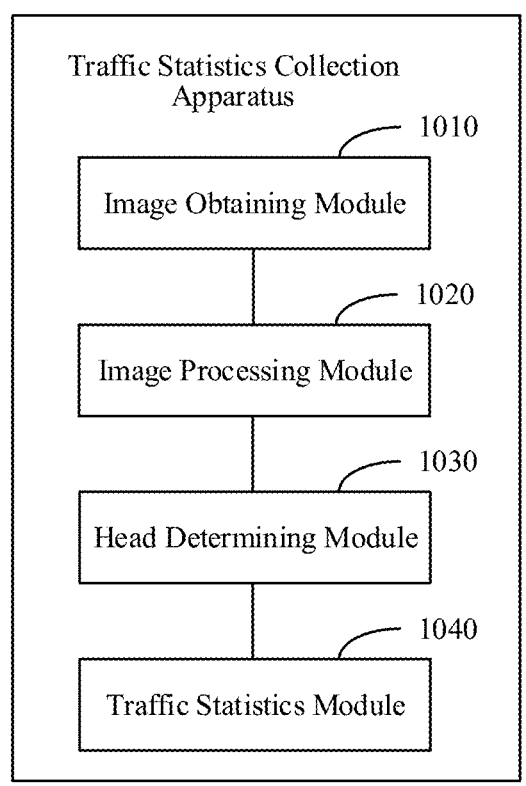
FIG. 10 is a block diagram illustrating a traffic statistics collection apparatus according to an exemplary embodiment of the present disclosure.

As shown in FIG. 10, FIG. 10 is a block diagram illustrating a traffic statistics collection apparatus according to an exemplary embodiment of the present disclosure. The apparatus includes:

an image obtaining module 1010 configured to obtain a first image of a target place;

an image processing module 1020 configured to perform body detection on the first image to obtain body detection boxes of respective target objects in the first image, where the body detection boxes indicate body areas of the respective target objects;

a head determining module 1030 configured to, for each target object of the respective target objects, determine a head detection box of the target object according to the body detection box of the target object, where the head detection box indicates a head area of the target object; and a traffic statistics module 1040 configured to obtain a traffic statistics result of the target place according to head detection boxes of the respective target objects.

Optionally, the head determining module 1030 is configured to:

obtain a width and a height of the body detection box; and perform a zoom-out operation on the body detection box according to the width and the height of the body detection box to obtain the head detection box.

Optionally, the target object is a person, the head determining module 1030 is further configured to:

determine an aspect ratio of the body detection box according to the width and the height of the body detection box;

obtain a target ratio range to which the aspect ratio of the body detection box belongs, where the target ratio range is determined based on a human body posture of the target object;

obtain a height reduction ratio corresponding to the target ratio range, and perform a zoom-out operation on the body detection box in a height direction based on the height reduction ratio.

Optionally, the head determining module 1030 is configured to:

perform a zoom-out operation on the body detection box in a width direction based on a preset width reduction ratio;

or obtain a height reduction ratio corresponding to the target ratio range, and perform a zoom-out operation on the body detection box in a height direction based on the height reduction ratio.

Optionally, the traffic statistics module 1040 is configured to:

for each target object of the respective target objects, determine a behavior state of the target object according to a position relationship between the head detection box of the target object and a set area in the first image of the target place, where the behavior state of the target object indicates whether the target object enters or leaves the target place; and determine the traffic statistics result of the target place according to behavior states of the respective target objects.

Optionally, the traffic statistics module 1040 is further configured to:

determine a position determination result for the target object according to the position relationship between the head detection box of the target object and the set area in the first image of the target place; where the position determination result indicates whether the target object enters the set area; and determine the behavior state of the target object according to the position determination result.

Optionally, the set area includes an entry area and an exit area, the traffic statistics module 1040 is further configured to:

in response to that two adjacent position determination results successively indicate the target object passing through the entry area and the exit area, determine that the behavior state indicates entering the target place; and/or in response to that two adjacent position determination results successively indicate the target object passing through the exit area and passing through the entry area, determine that the behavior state indicates leaving the target place.

Optionally, the first image is a frame of image in an image sequence, and the position relationship indicates whether the target object is in the set area;

the traffic statistics module 1040 is further configured to:

in response to that position relationships in more than a first set number of continuous frames indicate the target object being in the set area, determine that the position determination result for the target object indicates that the target object enters the set area.

Optionally, a bounding box of the set area includes an outer bounding box and an inner bounding box, the traffic statistics module 1040 is further configured to:

in response to that the head detection box of the target object is within the inner bounding box of the set area, determine that the position relationship between the head detection box and the set area indicates that the target object is in the set area;

in response to that the head detection box of the target object is between the inner bounding box and the outer bounding box of the set area, determine a position relationship between the head detection box and the set area according to a second image, where the second image is an image prior to the first image; and in response to that the head detection box of the target object is outside of the outer bounding box of the set area, determine that the position relationship between the head detection box and the set area indicates that the target object is not in the set area.

Optionally, the traffic statistics module 1040 is further configured to:

in response to that position relationship between the head detection box of the target object and a set area in the second image indicates the target object being in the set area, determine that the position relationship between the head detection box of the target object and the set area in the first image indicates that the target object is in the set area; and in response to that the position relationship between the head detection box of the target object and the set area in the second image indicates the target object being not in the set area, determine that the position relationship between the head detection box of the target object and the set area in the first image indicates that the target object is not in the set area.

Optionally, the apparatus further includes an area setting module, the area setting module is configured to:

obtain a setting request of a set area; and perform a corresponding setting processing on the set area according to the setting request, where the setting processing includes at least one of an opening processing for the set area, a closing processing for the set area, a setting processing for an opening time period corresponding to the set area, or a setting processing for an interval between the outer bounding box and the inner bounding box.

Optionally, a bounding box corresponding to the set area includes a first bounding line and a second bounding line, where the first bounding line is one side of the set area which is preset based on a direction for entering the target place such that the target place can be entered by way of the first bounding line; the second bounding line is one side of the set area which is preset based on a direction for leaving the target place such that the target place can be left by way of the second bounding line, and the first bounding line is opposite to the second bounding line;

the traffic statistics module 1040 is further configured to:

in response to that two adjacent position determination results are different, obtain a bounding line through which the target object recently passes, where the bounding line is the first bounding line or the second bounding line; and determine the behavior state of the target object according to the bounding line and the two adjacent position determination results.

Optionally, the traffic statistics module 1040 is further configured to:

in response to that the bounding line is the first bounding line and the two adjacent position determination results successively indicate the target object entering the set area and un-entering the set area, determine that the behavior state of the target object is entering the target place;

and/or in response to that the bounding line is the second bounding line and the two adjacent position determination results successively indicate the target object entering the set area and un-entering the set area, determine that the behavior state of the target object is leaving the target place.

Optionally, the apparatus further includes an object identifier determining module, the object identifier determining module is configured to:

obtain characteristic information of the respective target objects in the first image;

determine an object identifier corresponding to each of the respective target objects according to the characteristic information; and display the object identifier of the target object on the first image.

Optionally, the object identifier determining module is further configured to:

in response to that the target object is an object appearing for a first time, assign one or more object identifiers other than the object identifier included in the first image to the target object, and store a corresponding relationship between the characteristic information of the target object with the one or more object identifiers in a preset table; and in response to that the target object is not the object appearing for the first time, obtain the object identifier of the target object from the preset table according to the characteristic information of the target object.

Optionally, the object identifier determining module is further configured to:

for the target object to which the one or more object identifiers have been assigned, in response to position relationships in greater than a second set number of continuous frames not detecting the target object, delete the corresponding relationship between the characteristic information of the target object with the one or more object identifiers from preset table.

In another embodiment, the present disclosure further provides a non-transitory computer readable storage medium storing computer executable instructions thereon, where when the computer executable instructions are executed by one or more processors, the traffic statistics collection method described above is implemented.

In another embodiment, there is provided a computer program product including a computer program, where when the computer program is executed by a processor, the traffic statistics collection method described above is implemented.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements. In addition, the data involved in the present disclosure may be the data authorized by the user or fully authorized by all parties.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of the present disclosure based on the idea of the present disclosure. In conclusion, the content of the present specification should not be construed as any limitation to the present disclosure.

The invention claimed is:

1. A traffic statistics collection method, comprising:
obtaining a first image of a target place;
performing body detection on the first image to obtain body detection boxes of respective target objects in the first image, wherein the body detection boxes indicate body areas of the respective target objects;
for each target object of the respective target objects, determining a head detection box of the target object according to the body detection box of the target object, wherein the head detection box indicates a head area of the target object; and
obtaining a traffic statistics result of the target place according to head detection boxes of the respective target objects;
wherein the target object is a person, and wherein determining the head detection box of the target object according to the body detection box of the target object comprises:
obtaining a width and a height of the body detection box;
determining an aspect ratio of the body detection box according to the width and the height of the body detection box;
obtaining a target ratio range to which the aspect ratio of the body detection box belongs, wherein the target ratio range is determined based on a human body posture of the target object;
obtaining a height reduction ratio corresponding to the target ratio range, and
performing a zoom-out operation on the body detection box in a height direction based on the height reduction ratio.

2. The method according to claim 1, further comprising:
performing a zoom-out operation on the body detection box in a width direction based on a preset width reduction ratio.

3. The method according to claim 1, wherein obtaining a traffic statistics result of the target place according to the head detection boxes of the respective target objects comprises:
for each target object of the respective target objects, determining a behavior state of the target object according to a position relationship between the head detection box of the target object and a set area in the first image of the target place, wherein the behavior state of the target object indicates whether the target object enters or leaves the target place; and
determining the traffic statistics result of the target place according to behavior states of the respective target objects.

4. The method according to claim 3, wherein determining the behavior state of the target object according to the position relationship between the head detection box of the target object and the set area in the first image of the target place comprises:
determining a position determination result for the target object according to the position relationship between the head detection box of the target object and the set area in the first image of the target place; wherein the position determination result indicates whether the target object enters the set area; and
determining the behavior state of the target object according to the position determination result.

5. The method according to claim 4, wherein the set area comprises an entry area and an exit area, and
wherein determining the behavior state of the target object according to the position determination result comprises at least one of:
in response to that two adjacent position determination results successively indicate the target object passing through the entry area and passing through the exit area, determining that the behavior state indicates entering the target place;
in response to that two adjacent position determination results successively indicate the target object passing through the exit area and passing through the entry area, determining that the behavior state indicates leaving the target place.

6. The method according to claim 4, wherein the first image is a frame of image in an image sequence, and the position relationship indicates whether the target object is in the set area; and
wherein determining the position determination result for the target object according to the position relationship between the head detection box of the target object and the set area in the first image of the target place comprises:
in response to that position relationships in more than a first set number of continuous frames indicate the target object being in the set area, determining that the position determination result for the target object indicates that the target object enters the set area.

7. The method according to claim 3, wherein a bounding box of the set area comprises an outer bounding box and an inner bounding box, and
wherein the method further comprises:
in response to that the head detection box of the target object is within the inner bounding box of the set area, determining that the position relationship between the head detection box and the set area indicates that the target object is in the set area;
in response to that the head detection box of the target object is between the inner bounding box and the outer bounding box of the set area, determining a position relationship between the head detection box and the set area according to a second image, wherein the second image is an image prior to the first image; and
in response to that the head detection box of the target object is outside of the outer bounding box of the set area, determining that the position relationship between the head detection box and the set area indicates that the target object is not in the set area.

8. The method according to claim 7, wherein determining the position relationship between the head detection box and the set area according to the second image comprises:
in response to that a position relationship between the head detection box of the target object and a set area in the second image indicates the target object being in the set area, determining that the position relationship between the head detection box of the target object and the set area in the first image indicates that the target object is in the set area; and in response to that the position relationship between the head detection box of the target object and the set area in the second image indicates the target object being not in the set area, determining that the position relationship between the head detection box of the target object and the set area in the first image indicates that the target object is not in the set area.

9. The method according to claim 7, further comprising:
obtaining a setting request of a set area; and
performing a corresponding setting processing on the set area according to the setting request, wherein the setting processing comprises at least one of an opening processing for the set area, a closing processing for the set area, a setting processing for an opening time period corresponding to the set area, or a setting processing for an interval between the outer bounding box and the inner bounding box.

10. The method according to claim 4, wherein a bounding box corresponding to the set area comprises a first bounding line and a second bounding line, wherein the first bounding line is one side of the set area which is preset based on a direction for entering the target place such that the target place can be entered by way of the first bounding line; the second bounding line is one side of the set area which is preset based on a direction for leaving the target place such that the target place can be left by way of the second bounding line, and the first bounding line is opposite to the second bounding line; and wherein determining the behavior state of the target object according to the position determination result comprises:

in response to that two adjacent position determination results are different, obtaining a bounding line through which the target object recently passes, wherein the bounding line is the first bounding line or the second bounding line; and determining the behavior state of the target object according to the bounding line and the two adjacent position determination results.

11. The method according to claim 10, wherein determining the behavior state of the target object according to the bounding line and the two adjacent position determination results comprises at least one of:

in response to that the bounding line is the first bounding line and the two adjacent position determination results successively indicate the target object entering the set area and un-entering the set area, determining that the behavior state of the target object is entering the target place;

in response to that the bounding line is the second bounding line and the two adjacent position determination results successively indicate the target object entering the set area and un-entering the set area, determining that the behavior state of the target object is leaving the target place.

12. The method according to claim 1, further comprising:
obtaining characteristic information of the respective target objects in the first image;
determining an object identifier corresponding to each of the respective target objects according to the characteristic information; and displaying the object identifier of the target object on the first image.

13. The method according to claim 12, wherein determining the object identifier corresponding to each of the respective target objects according to the characteristic information comprises:

in response to that the target object is an object appearing for a first time, assigning one or more object identifiers other than the object identifier comprised in the first image to the target object, and storing a corresponding relationship between the characteristic information of the target object with the one or more object identifiers in a preset table; and in response to that the target object is not the object appearing for the first time, obtaining the object identifier of the target object from the preset table according to the characteristic information of the target object.

14. The method according to claim 13, further comprising:

for the target object to which the one or more object identifiers have been assigned, in response to position relationships in greater than a second set number of continuous frames not detecting the target object, deleting the corresponding relationship between the characteristic information of the target object with the one or more object identifiers from preset table.

15. A computer device comprising a memory, a processor and a computer program that is stored in the memory and is capable of running on the processor, wherein when the processor executes the computer program, the following methods are implemented:

obtaining a first image of a target place;

performing body detection on the first image to obtain body detection boxes of respective target objects in the first image, wherein the body detection boxes indicate body areas of the respective target objects;

for each target object of the respective target objects, determining a head detection box of the target object according to the body detection box of the target object, wherein the head detection box indicates a head area of the target object; and obtaining a traffic statistics result of the target place according to head detection boxes of the respective target objects;

wherein the target object is a person, and wherein determining the head detection box of the target object according to the body detection box of the target object comprises:

obtaining a width and a height of the body detection box;

determining an aspect ratio of the body detection box according to the width and the height of the body detection box;

obtaining a target ratio range to which the aspect ratio of the body detection box belongs, wherein the target ratio range is determined based on a human body posture of the target object;

obtaining a height reduction ratio corresponding to the target ratio range, and performing a zoom-out operation on the body detection box in a height direction based on the height reduction ratio.

16. A non-transitory computer readable storage medium storing computer executable instructions thereon, wherein when the computer executable instructions are executed by one or more processors, the following methods are implemented:

obtaining a first image of a target place;
performing body detection on the first image to obtain body detection boxes of respective target objects in the first image, wherein the body detection boxes indicate body areas of the respective target objects;
for each target object of the respective target objects, determining a head detection box of the target object according to the body detection box of the target object, wherein the head detection box indicates a head area of the target object; and
obtaining a traffic statistics result of the target place according to head detection boxes of the respective target objects;
wherein the target object is a person, and wherein determining the head detection box of the target object according to the body detection box of the target object comprises:
  obtaining a width and a height of the body detection box;
  determining an aspect ratio of the body detection box according to the width and the height of the body detection box;
  obtaining a target ratio range to which the aspect ratio of the body detection box belongs, wherein the target ratio range is determined based on a human body posture of the target object;
  obtaining a height reduction ratio corresponding to the target ratio range, and
  performing a zoom-out operation on the body detection box in a height direction based on the height reduction ratio.

* * * * *